US007018085B2

(12) United States Patent
Lee et al.

(10) Patent No.: US 7,018,085 B2
(45) **Date of Patent: *Mar. 28, 2006**

(54) ILLUMINATION DEVICE AND REFLECTION TYPE LIQUID CRYSTAL DISPLAY DEVICE USING THE SAME

(76) Inventors: Keun-Woo Lee, 903-201, Jugong Apt., #970-3, Youngtong-dong, Paldal-gu, Suwon-si, Gyeonggi-do (KR); Jin-Baek Kim, 352-404, Toegye Apt., #875, Keumjung-dong, Gunpo-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/838,036

(22) Filed: May 3, 2004

(65) Prior Publication Data

US 2004/0201979 A1 Oct. 14, 2004

Related U.S. Application Data

(63) Continuation of application No. 10/074,466, filed on Feb. 12, 2002, now Pat. No. 6,752,504.

(30) Foreign Application Priority Data

Sep. 5, 2001 (KR) ............................... 2001-54446

(51) Int. Cl.
*F21V 7/04* (2006.01)

(52) U.S. Cl. ......................... 362/610; 362/612; 349/65

(58) Field of Classification Search .................. 362/26, 362/27, 31, 327, 551, 559, 558, 560, 561, 362/610, 612; 349/65, 68

See application file for complete search history.

(56) References Cited

U.S. PATENT DOCUMENTS

| | | | | |
|---|---|---|---|---|
| 3,761,704 | A * | 9/1973 | Takeichi et al. | 362/27 |
| 3,838,909 | A * | 10/1974 | Fitzgibbons | 349/62 |
| 5,050,946 | A * | 9/1991 | Hathaway et al. | 385/33 |
| 5,055,978 | A * | 10/1991 | Rogoff | 362/31 |
| 5,442,522 | A * | 8/1995 | Kalmanash | 362/26 |
| 5,664,862 | A * | 9/1997 | Redmond et al. | 362/31 |
| 6,752,504 | B1 * | 6/2004 | Lee et al. | 362/27 |
| 2002/0196617 | A1 * | 12/2002 | Huang | 362/27 |

FOREIGN PATENT DOCUMENTS

EP 0 478 102 A2 4/1992

* cited by examiner

*Primary Examiner*—Stephen F Husar
(74) *Attorney, Agent, or Firm*—Cantor Colburn LLP

(57) ABSTRACT

Disclosed are an illumination device capable of improving an optical efficiency of a light generated from a light source and a reflection type liquid crystal device using the, illumination device. Between at least one light source and a first light guiding plate, which is provided to uniformly project the light incident from a first side towards a second side, a second light guiding plate for projecting the incident light towards the first side of the first light guiding plate is provided. A distance between a light projecting portion of the second light guiding plate and a light reflecting portion opposite the light projecting portion becomes narrow as an amount of light flux of the light emitted from at least one light source decreases. Accordingly, the light efficiency can be improved by increasing the probability of variation in optical routes for the light generated from each light source, though the number of the light sources disposed at a side of the second light guiding plate is increased.

30 Claims, 12 Drawing Sheets

ILLUMINATION DEVICE AND REFLECTION TYPE LIQUID CRYSTAL DISPLAY DEVICE USING THE SAME

CROSS REFERENCE TO RELATED APPLICATIONS

This application is a continuation application of U.S. Ser. No. 10/074,466, filed Feb. 12, 2002, now U.S. Pat. No. 6,752,504, issued on Jun. 22, 2004, which claims priority to Korean Patent Application No. 2001-54446, filed on Sep. 5, 2001 and is herein incorporated by reference in its entirety.

BACKGROUND OF THE INVENTION

1. Field of the Invention

The present invention relates to an illumination device and a reflection type liquid crystal device using the same, and more particularly to an illumination device capable of improving an optical efficiency of a light emitted from a light source and a reflection type liquid crystal device using the same.

2. Description of the Related Art

Generally, a voltage is applied to a liquid crystal display device to cause a change in an alignment of liquid crystal. As a result, the liquid crystal cells undergoes a change of optical characteristics such as a birefringence, a rotatory polarization, a dichroism and a light scattering according to the changed alignment of the liquid crystal. Therefore, the liquid crystal display device can display an image according to the changes of the optical characteristics of the liquid crystal cell.

The liquid crystal display is classified into a transmission type liquid crystal display using a backlight and a reflection type liquid crystal display using an external light source, depending on a light source. The transmission type liquid crystal display is widely used, but the use of the backlight increases the power consumption as well as the volume and weight of the liquid crystal display. In order to solve the above drawbacks of the transmission type liquid crystal display having the backlight therein, a reflection type liquid crystal display, which does not use the backlight, has been variously studied and developed.

In addition, the reflection type liquid crystal display is anticipated to replace the transmission type liquid crystal display due to consumer demands on portable information display devices. Computer terminals using such a reflection type liquid crystal display to which a white-and-black TN mode or a white-and-black STN mode is applied, are commercially available and research and development for a color reflection type liquid crystal display is currently underway.

The development of the color reflection type liquid crystal display is one of the important subjects targeted in IMT-2000 (International Mobile Telecommunications-2000), which is actively studied and developed as a next generation mobile telecommunication. In this regard, extensive research for lighter, slimmer and compact -sized structures is currently underway.

FIG. 1 is a schematic plan view showing an illumination device used in a conventional reflection type liquid crystal display.

Referring to FIG. 1, the illumination device 30 used in the conventional reflection type liquid crystal display includes a light source section 10 and a light guiding section 20, which is provided at a side of the light source section 20 and guides the light from the light source section 10 to a liquid crystal display panel (not shown).

The light source section 10 includes a plurality of light sources 11a and 11b for emitting the light and a first light guiding plate 12, which is provided at a side of the light sources 11a and 11b for guiding the light towards the light guiding section 20. The light sources 11a and 11b include a light emitting diode (LED) in the form of a point-shaped light source. The light sources 11a and 11b are respectively installed at both ends 12a and 12b of the first light guiding plate 12, so that the light emitted from the light sources 11a and 11b are incident into both ends 12a and 12b of the first light guiding plate 12.

The first light guiding plate 12 has a hexahedron bar structure. The light guiding section 20 is arranged at a first side 12c of the first guiding plate 12 and patterns 12e are formed at a second side 12d of the first guiding plate 12 opposite the first side 12c. The light, which is incident into both ends 12a and 12b of the first guiding plate 12, is reflected by the patterns 12e formed at the second side 12d of the first guiding plate 12 and incident into the light guiding section 20 through the first side 12c of the first guiding plate 12.

The light guiding section 20 has a hexahedron plate structure. The light guiding section 20 is arranged above the liquid crystal display panel and guides the light incident from the light source section 10 towards the liquid crystal display panel.

However, in order to make a large screen for the reflection type liquid crystal display, it is required to increase the amount of the light emitted from the light source section 10 to obtain a desired brightness. In order to increase the amount of the light emitted from the light source section 10, it is necessary to increase the number of light sources 11a and 11b installed at both ends 12a and 12b of the first light guiding plate 12, so the width of the first light guiding plate 12 is also increased.

FIG. 2 is a plan view showing the conventional light source section with increased number of light sources.

Referring to FIG. 2, the light source section 10 includes a plurality of light sources 13a to 13h which are arranged at both ends 12a and 12b of the first light guiding plate 12. In FIG. 2, four light sources are arranged at each end of the first light guiding plate 12. The widths of both ends 12a and 12b of the first light guiding plate 12 are enlarged corresponding to the increased number of the light sources 13a to 13h.

Therefore, since the number of the light sources 13a to 13h arranged at both ends 12a and 12b of the first light guiding plate 12 is increased by four times as compared with the number of the light sources 11a and 11b shown in FIG. 1, the brightness thereof has to be correspondingly improved.

However, as shown in FIG. 2, when the light sources 13a to 13h are arranged at both ends 12an and 12b of the first light guiding plate 12, the light sources 13a and 13e are relatively adjacent to the patterns 12e, but the light sources 13d and 13h are relatively remote from the patterns 12e. The light generated from the light sources 13d and 13h remote from the patterns 12e of the first light guiding plate 12 rarely arrives at the patterns 12e of the first light guiding plate 12 as compared with the light generated from the light sources 13a and 13e adjacent to the patterns 12e.

Accordingly, even though the number of light sources 13a to 13h arranged at both ends 12a and 12b of the first light guiding plate 12 increases, the brightness of the reflection type liquid crystal display cannot be sufficiently improved in proportion to the number of light sources.

SUMMARY OF THE INVENTION

The present invention solves the aforementioned problems, and provides an illumination device capable of improving an optical efficiency of a light emitted from a light source section.

Further, the present invention provides a liquid crystal display device having an illumination device capable of improving an optical efficiency of a light emitted from a light source section.

In one aspect of the invention, there is provided an illumination device including a light generator for generating a light, a first light guiding plate including a first portion through which the light is incident and a second portion from which the light is emitted, and a second light guiding plate including opposite first and second side portions, at least one of which is adjacent to the light generator, a light projecting portion adjacent to the first portion of the first light guiding plate and a light reflecting portion having a distance from the light projecting portion, At least one light source is disposed adjacent to at least one of first and second side portions of the second light guiding plate for providing the light into the second light guiding plate. The distance between the light projecting portion of the second light guiding plate and the light reflecting portion becomes narrow as an amount of light flux of the light emitted from the light generator decreases.

According to one embodiment of the present invention, at least one light source may be a point-shaped light source.

The light reflecting portion of the second light guiding plate includes a concave section. The concave section may have a V-shape inclined from opposite side ends of the light reflecting portion adjacent to the first and second side portions.

The concave section has a bottom portion, and a position of the bottom portion is defined by a following equation: x: y=w1: w2, wherein, x is a linear distance from the first side portion to the bottom portion, y is a linear distance from the second side portion to the bottom portion, x+y is a linear distance from the first side portion to the second side portion, w1 is a width of the first side portion, and w2 is a width of the second side portion. A value of x may be substantially equal to a value of y.

The number of the light source disposed adjacent to the first side portion is the same as or different from the number of the light source disposed adjacent to the second side portion.

The widths of the first and second side portions are defined by a following equation; w1: w2=n1: n2, wherein w1 is the width of the first side portion, and w2 is the width of the second side portion, n1 is the number of the light source disposed adjacent to the first side portion, and n2 is the number of the light source disposed at the second side portion.

A linear distance between of the bottom portion of the light reflecting portion and the light projecting portion is variable with respect to the widths of the first and second side portions so as to be smaller than a smaller width of the widths of the first and second side portions.

A plurality of groove patterns is formed at the concave section of the second light guiding plate.

The second light guiding plate includes a light scattering member, which uniformly diffuses the light incident through the first and second side portion and uniformly distributes a light flux of the light projected through the light projecting portion.

In another aspect, there is provided a reflection type light crystal display device comprising a liquid crystal display panel for displaying an image and an illumination device disposed in a front of the liquid crystal display panel. The illumination device includes light generator for generating a light, a first light guiding plate including a first portion through which the light is incident and a second portion from which the light is emitted, and a second light guiding plate including opposite first and second side portions, at least one of which is adjacent to the light generator, a light projecting portion adjacent to the first portion of the first light guiding plate and a light reflecting portion having a distance from the light projecting portion. The distance between the light projecting portion of the second light guiding plate and the light reflecting portion becomes narrow as an amount of light flux of the light emitted from the light generator decreases.

Therefore, even when the number of the light sources disposed at a side of the second light guiding plate is increased, the light efficiency of the plurality of light sources can be improved by increasing the probability of variation in optical routes for the light emitted from the light sources and by allowing the light to arrive at the concave section.

BRIEF DESCRIPTION OF THE DRAWINGS

The above objects and other advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
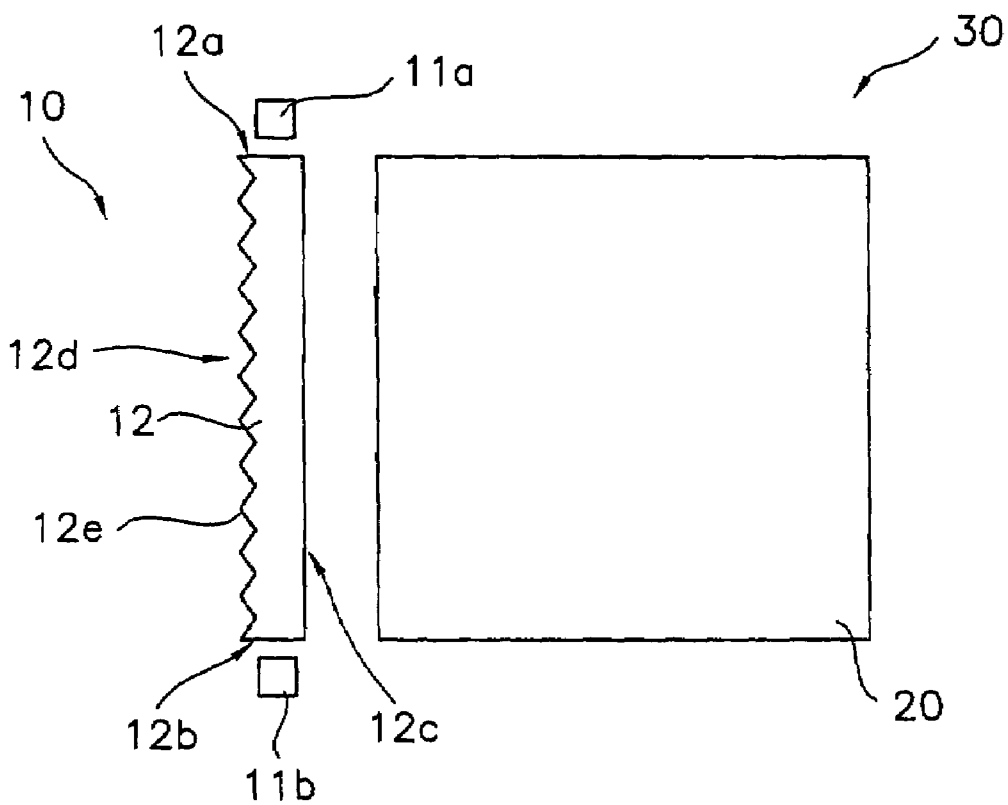
FIG. 1 is a plan view showing an illumination device used in a conventional reflection type liquid crystal display device.
Figure 2:
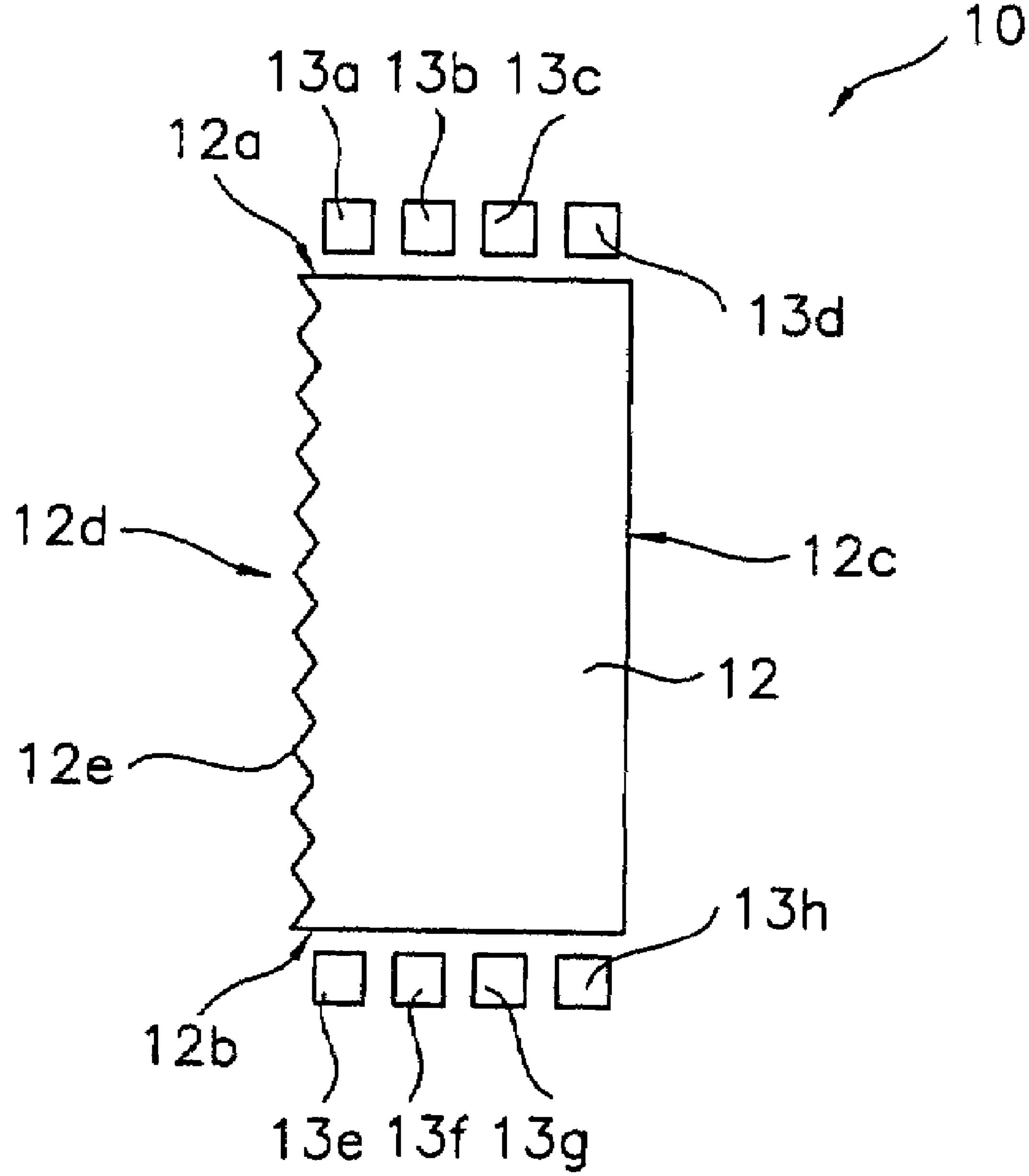
FIG. 2 is a plan view of a light source section shown in FIG. 1.
Figure 3:
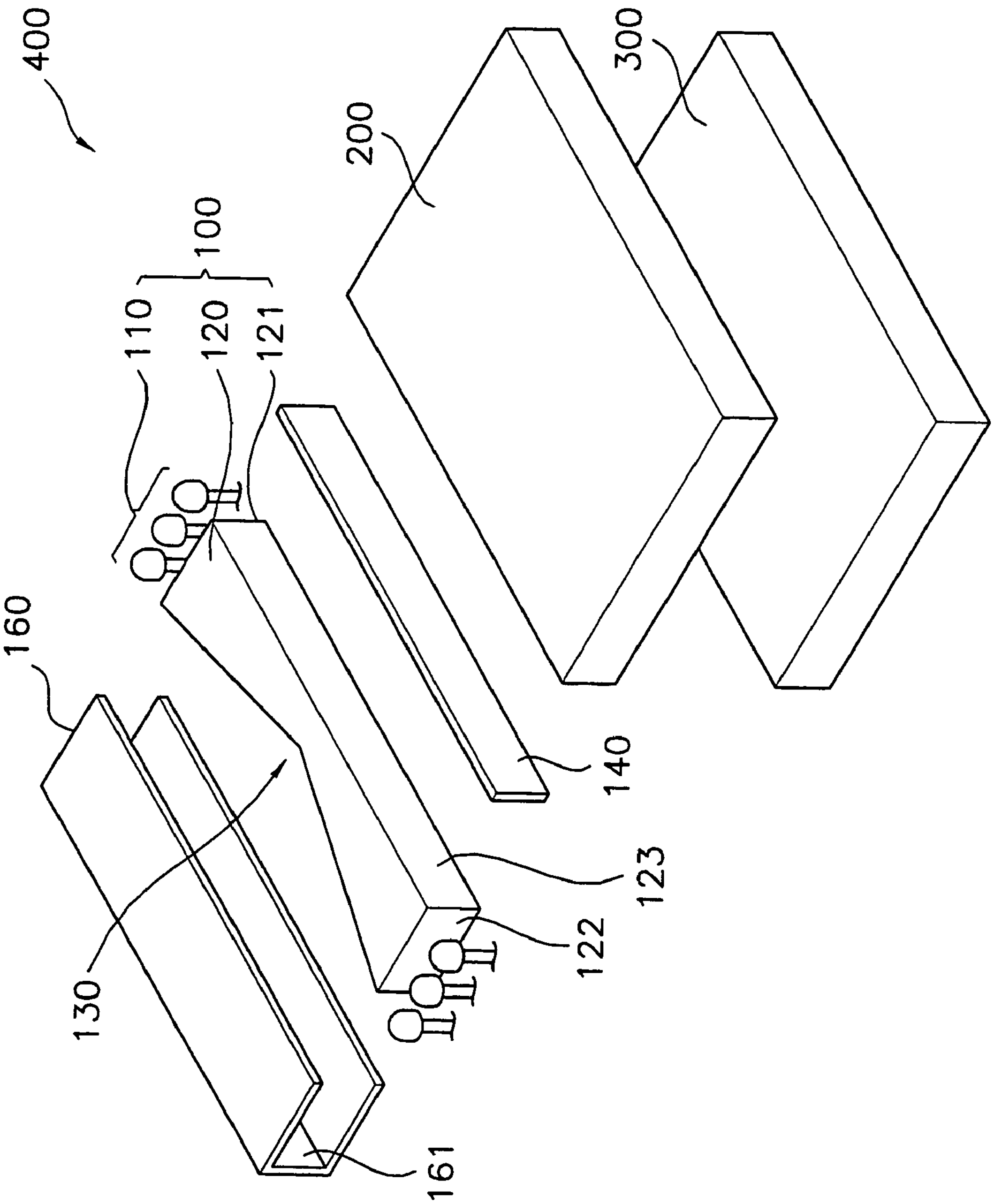
FIG. 3 is an exploded perspective view showing a reflection type liquid crystal display device according to one exemplary embodiment of the present invention.

FIG. 3 is an exploded perspective view schematically showing a reflection type liquid crystal display device according to one exemplary embodiment of the present invention.

Referring to FIG. 3, the reflection type liquid crystal display device 400 includes a light source section 100, a light guiding section 200 provided at a side of the light source section 100, and a liquid crystal display panel section 300 disposed below the light guiding section 200.

The light source section 100 includes a plurality of light sources 110 for emitting the light and a second light guiding plate 120 for guiding the light towards the light guiding section 200. The plurality of light sources 110 is arranged at opposite side ends of the second light guiding plate 120. The light sources 110 include a light emitting device in the form of a point-shaped light source such as a light emitting diode (LED).

The second light guiding plate 120 has a first light incident surface 121 and a second light incident surface 122 opposite the first light incident surface 121 in which plural light sources 110 are installed adjacent to the first and second light incident surfaces 121 and 122 to emit the light into the first and second light incident surfaces 121 and 122, respectively. In addition, the second light guiding plate 120 has a light projecting surface 123 for projecting the light, and a light reflecting surface 130 having a concave form. The light reflection surface 130 of the concave form has a V-shape inclined from opposite side ends adjacent to the first and second light incident surfaces 121 and 122.

The second light guiding plate 120 may be formed of a transparent plastic material, for example, acryl such as polymethylmetacrylate (PMMA). As such a material for forming the second light guiding plate 120, ARTON (trade name manufactured by Japan Synthetic Rubber Co., Ltd.) is commercially available.

A housing 160 supports the light source section 100 and the light guiding section 200 by receiving the light source section 100 and a portion of the light guiding section 200 adjacent to the light source section 100. The housing 160 may be formed of a metal such as aluminum or brass. A reflection member 161 is formed in the housing 160. The reflection member 161 reflects the light emitted from the light source section 100 towards the light guiding section 200.

The light guiding section 200 is disposed adjacent to the light projecting surface 123 of the second light guiding plate 120. The light guiding section 200 has a hexahedron plate structure and guides the light from the second light guiding plate 120 to the liquid crystal display panel 300. The light guiding section 200 may be made of a transparent plastic material, for example, acryl such as polymethylmetacrylate (PMMA). As such a material for forming the light guiding section 200, ARTON (trade name manufactured by Japan Synthetic Rubber Co., Ltd.) is commercially available.

A diffusing plate 140 is disposed between the light guiding section 200 and the light source section 100 and uniformly distributes a light flux of the light incident from the light source section 100 into the light guiding section 200.

Figure 4:
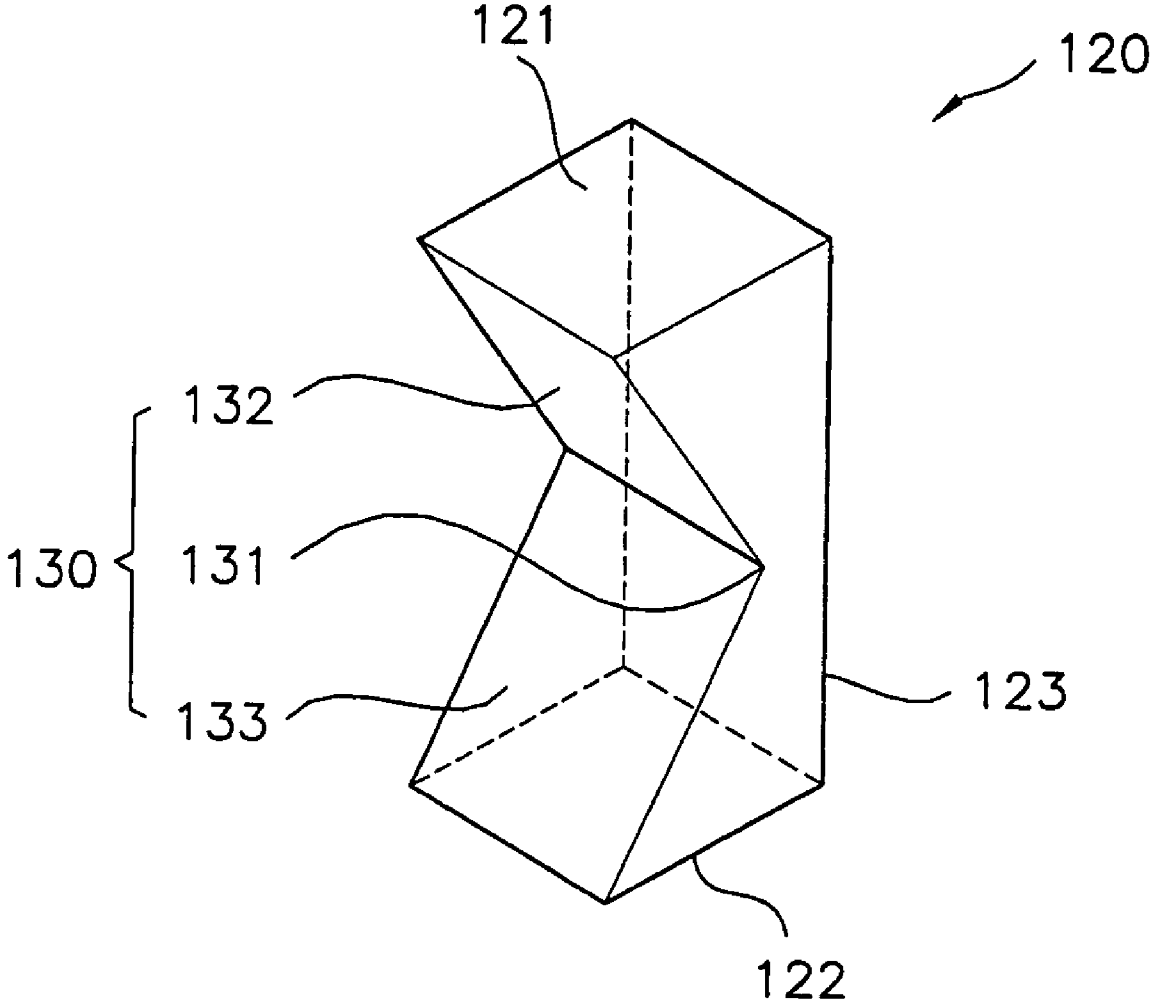
FIG. 4 is a perspective view showing a structure of a light guiding plate shown in FIG. 3.
Figure 5:
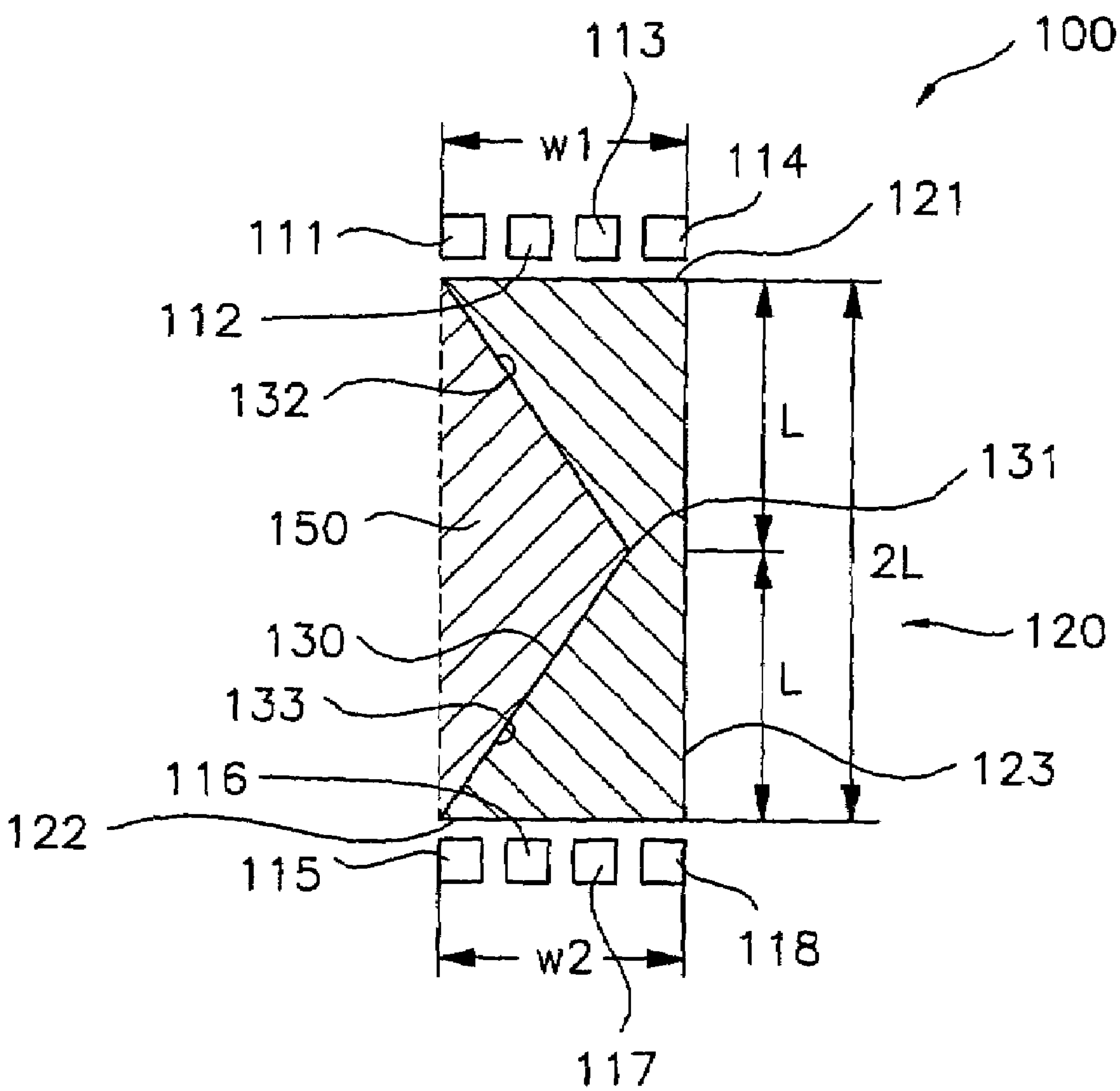
FIGS. 5 and 6 are plan views showing a structure of a light source section shown in FIG. 3.
Figure 6:
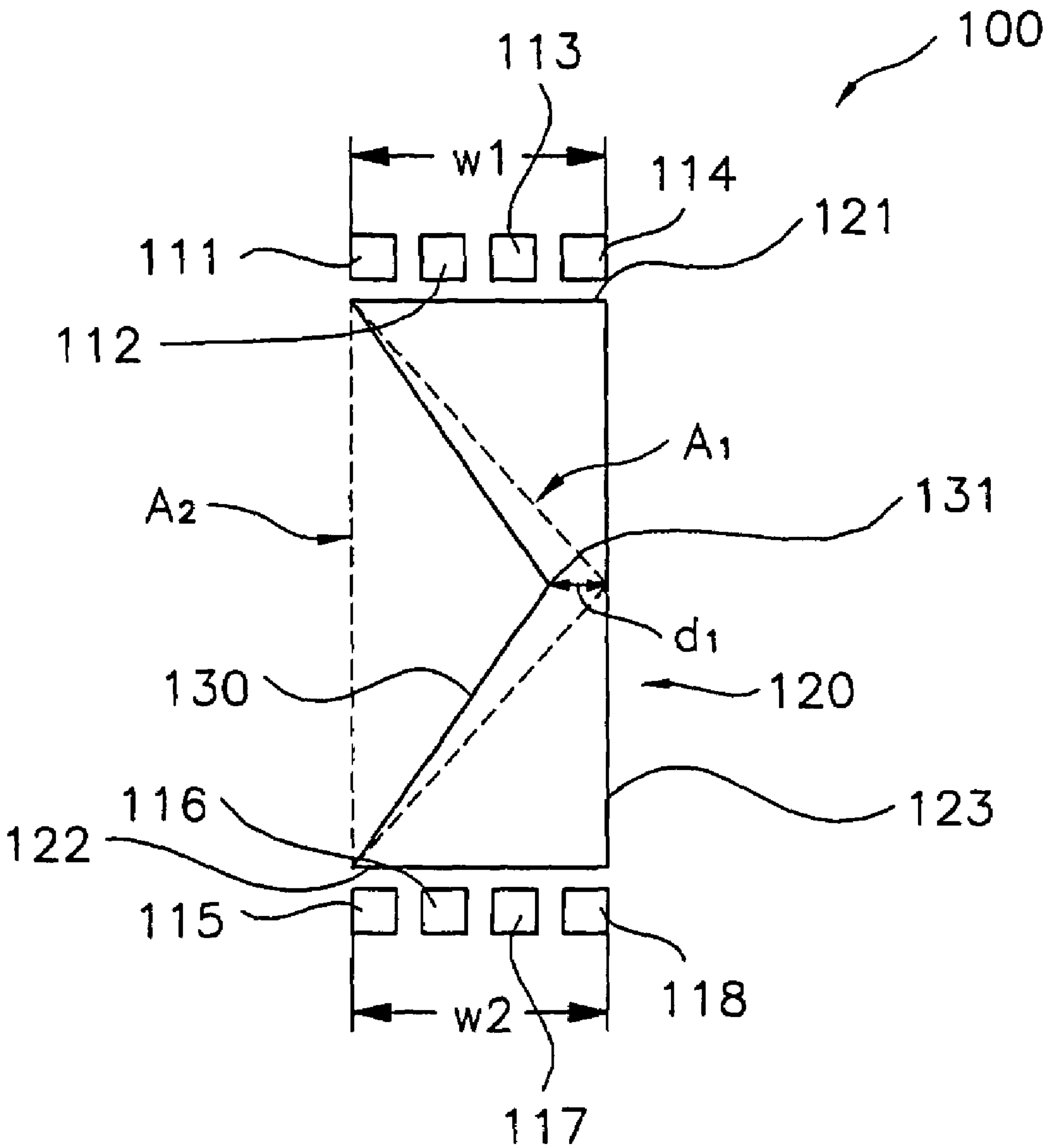

FIG. 4 is a perspective view for explaining the structure of the second light guiding plate shown in FIG. 3. FIGS. 5 and 6 are plan views of the light source section shown in FIG. 3. In FIGS. 4 to 6, a bottom portion of the concave section 130 is positioned around a center between the first and second light incident surfaces 121 and 122 of the second light guiding plate 120.

Referring to FIGS. 4 and 5, the light source section 100 includes the second light guiding plate 120 and a plurality of light sources 111 to 118 arranged adjacent to opposite side ends of the second light guiding plate 120. Four light sources are arranged adjacent to each of opposite side ends of the second light guiding plate 120.

The second light guiding plate 120 has the first light incident surface 121 and the second light incident surface 122 opposite the first light incident surface 121 in which the light sources 111 to 118 are disposed adjacent to the first and second light incident surfaces 121 and 122 to emit the light into the first and second light incident surfaces 121 and 122, respectively. In addition, the second light guiding plate 120 has the light projecting surface 123 for projecting the light which is incident through the first and second incident surfaces 121 and 122, and the first concave section 130 having the V-shape inclined from opposite side ends thereof adjacent to the first and second incident surfaces 121 and 122.

The first concave section 130 can be formed through cutting the second light guiding plate 120 in a V-shape. Alternatively, the first concave section 130 can be manufactured by an injection molding process.

The first concave section 130 having the above-mentioned structure includes a first inclined surface 132 positioned adjacent to the first light incident surface 121 and a second inclined surface 133 positioned adjacent to the second light incident surface 122 about the bottom portion 131. The optical route of the light incident through the first and second light incident surfaces 121 and 122 is changed by the first and second inclined surfaces 132 and 133, so the light advances towards the light guiding section 200 through the light projecting surface 123.

A position of the bottom portion 131 in the first concave section 130 is defined by the following equation1:

$$x:y=w1:w2, \qquad \text{(Equation 1)}$$

wherein x is a linear distance from the first light incident surface 121 to the bottom portion 131, y is a linear distance from the second light incident surface 122 to the bottom portion 131, x+y is a linear distance from the first light incident surface 121 to the second light incident surface 122, w1 is a width of the first light incident surface 121, and w2 is a width of the second light incident surface 122.

The widths (w1 and w2) of the first and second light incident surfaces are defined by the following equation 2:

$$w1:w2=n1:n2, \qquad \text{(Equation 2)}$$

wherein w1 is the width of the first light incident surface 121, and w2 is the width of the second light incident surface 122, n1 is the first number of the light source installed at the first light incident surface 121, and n2 is the second number of the light source installed at the second light incident surface 122.

As shown in FIG. 5, since four light sources are equally installed adjacent to each of the first and second light incident surfaces 121 and 122, the widths of the first and second light incident surfaces 121 and 122 are identically formed according to the equation 2. In addition, when the widths of the first and second light incident surfaces 121 and 122 are the same, the bottom portion 131 is positioned at the center between the first and second light incident surfaces 121 and 122 according to the equation 1.

In detail, when the distance between the first and second light incident surfaces 121 and 122 is "2L", the bottom portion 131 of the first concave section 130 is spaced apart from the first and second light incident surfaces 121 and 122 of the second light guiding plate 120 by the distance of "L", respectively.

As shown in FIG. 5, since the first concave section 130 is formed in the second light guiding plate 120, a margin space 150 is formed in the second light guiding plate 120. That is, an effective space occupied by the second light guiding plate 120 is reduced because of the first concave section 130. Therefore, the size of the reflection type liquid crystal display device 400 can be reduced through utilizing the margin space 150.

As shown in FIG. 6, a predetermined distance d1 is maintained between the bottom portion 131 and the light projecting surface 123. The predetermined distance d1 may be variable within a range of 0<d1<w1 or w2. If the predetermined distance d1 is "0", that is, in case of "A1", the second light guiding plate 120 is divided about the bottom portion 131. If the predetermined distance d1 is "w1 or w2", that is, in case of "A2", the second light guiding plate 120 is formed as a hexahedron bar shape, which is identical to the conventional light guiding plate.

Therefore, the distance d1 is defined in a various range except for "0" and "w1 or w2".

In addition, if the distance d1 between the bottom portion 131 and the light projecting surface 123 is defined near to "w1 or w2", the optical efficiency of the light is relatively reduced as compared with that the distance d1 is defined near to "0". If the distance d1 is defined near to "0", the optical efficiency of the light is improved, however, the second light guiding plate 120 is vulnerable to an exterior impact. Accordingly, it is preferable to form the bottom portion 131 of the second light guiding plate 120 to have an optimum height capable of improving the optical efficiency of the light and preventing the second light guiding plate 120 from being damaged.

Table 1 shows the difference of brightness in the light guiding section and the liquid crystal display panel when the conventional hexahedron bar shaped light guiding plate arranged between the light source section and the light guiding section is used, and when the light guiding section of the present invention having the shape as shown in FIG. 4 is used.

TABLE 1

| | LED Nos. | Brightness in light incident portion of LGP(cd/m$^2$) | Brightness in center of LGP(cd/m$^2$) | Brightness in center of panel (cd/m$^2$) |
|---|---|---|---|---|
| hexahedron bar shaped LGP | 4 | 48 | 38 | 2.5 |
| V-shaped concave type LGP | 4 | 69 | 53 | 4.2 |

Referring to table 1, four light sources (LEDs) are disposed at opposite side ends of the light guiding plate in both cases. Under the above condition, the present invention using the improved light guiding plate represents the enhanced brightness in the light incident portion and the center portion of the light guiding section and the center portion of the liquid crystal display panel as compared with the conventional hexahedron bar shaped light guiding plate.

That is, the light guiding plate having the structure of the present invention improves the optical efficiency of the light emitted from each light source disposed at opposite side ends of the light guiding plate.

Figure 7:
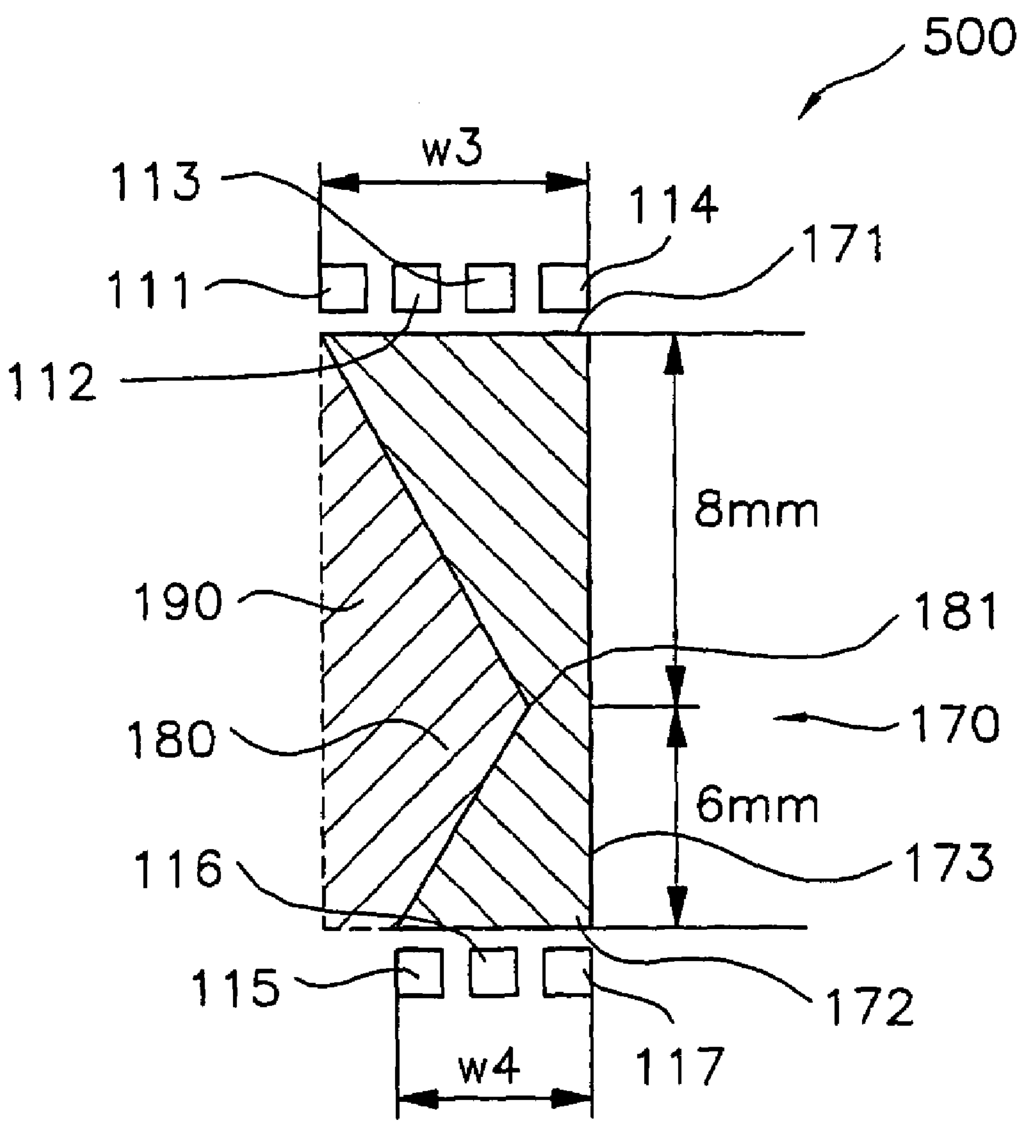
FIGS. 7 and 8 are plan views showing a structure of a light source section according to another exemplary embodiment of the present invention.
Figure 8:
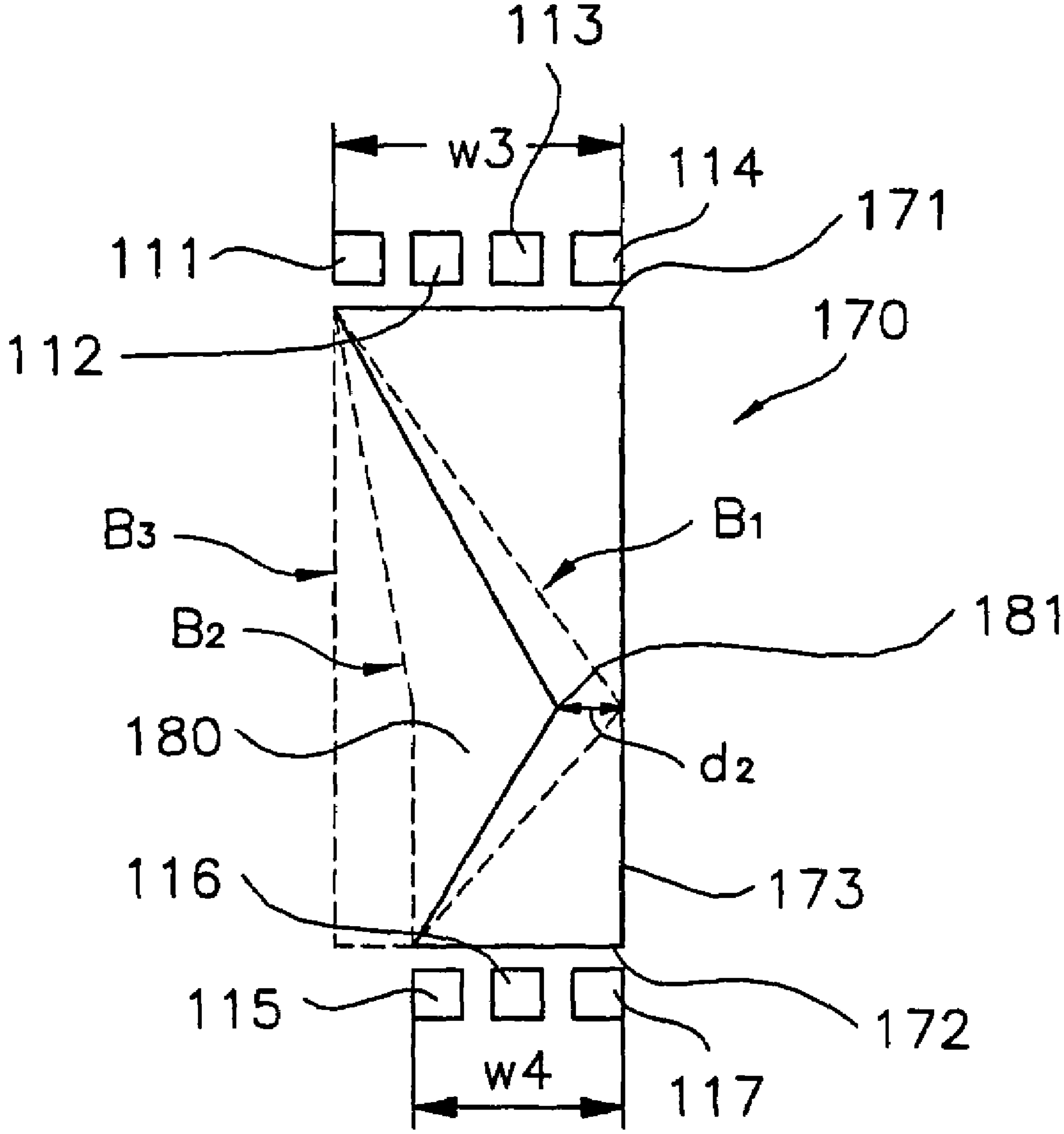

FIGS. 7 and 8 are plan views showing the structure of the light source section according to another exemplary embodiment of the present invention.

Referring to FIG. 7, a light source section 500 includes a third light guiding plate 170 and a plurality of light sources 111 to 117 disposed adjacent to opposite side ends 171 and 172 of the third light guiding plate 170. Different numbers of light sources are disposed at opposite side ends 171 and 172 of the third guiding plate 170, respectively. That is, four light sources 111 to 114 are disposed at the third light incident surface 171 of the third light guiding plate 170 and three light sources 115 to 117 are disposed at the fourth light incident surface 172 opposite the third light incident surface 171 of the third light guiding plate 170.

Since the numbers of light sources installed at third and fourth light incident surfaces 171 and 172 are different from each other, widths (w3 and w4) of the third and fourth light incident surfaces 171 and 172 are different from each other according to the above-mentioned equation 2. That is, the number of the light sources 111 to 114 installed at the third light incident surface 171 is larger than the number of the light sources 115 to 117 installed at the fourth light incident surface 172, so the width (w3) of the third light incident surface 171 is larger than the width (w4) of the fourth light incident surface 172.

For example, when the width (w3) of the third light incident surface 171 is 4 mm, the width (w4) of the fourth light incident surface 172 is 3 mm, and the distance between the third and fourth light incident surfaces 171 and 172 is 14 mm, a bottom portion 181 of a second concave section 180 is positioned apart from the third light incident surface 171 by 8 mm, and apart from the fourth light incident surface 172 by 6 mm, according to the above-mentioned equation 1.

By forming the second concave section 180 in the third light guiding plate 170, a margin space 190 is obtained. That is, due to the second concave section 180 formed in the third light guiding plate 170, the effective space occupied by the third light guiding plate 170 is reduced. Therefore, the size of the reflection type liquid crystal display device 400 can be reduced through utilizing the margin space 190.

Referring to FIG. 8, a predetermined distance d2 is maintained between the bottom portion 181 and a light projecting surface 173. The predetermined distance d2 may be variable within a range of 0<d2<w4. If the predetermined distance d2 is "0", that is, in case of "B1", the third light guiding plate 170 is divided into two pieces about the bottom portion 181. If the predetermined distance d2 is "w4", that is, in case of "B2", a flat plate-shaped structure is formed from the bottom portion 181 of the third light guiding plate 170 to the fourth light incident surface 172, so the optical efficiency of the light incident through the fourth light incident surface 172 is reduced. In addition, if the predetermined distance d2 is "w3", that is, in case of "B3", the third light guiding plate 170 is formed as a hexahedron bar shape, which is identical to the conventional light guiding plate.

Therefore, the distance d2 is defined in a range of 0<d2<w4.

Figure 9:
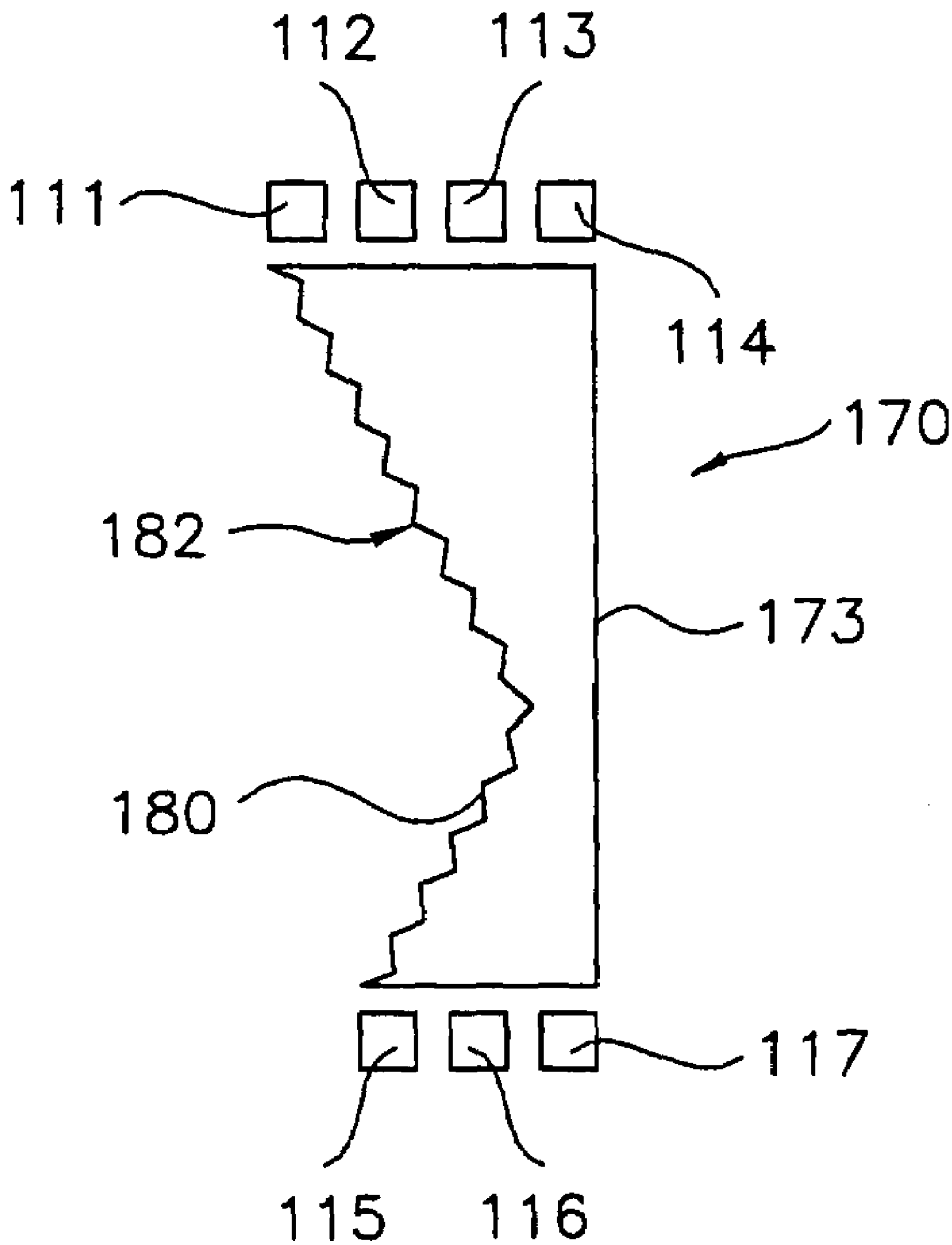
FIG. 9 is a plan view of a light guiding plate shown in FIG. 7 formed with a pattern.
Figure 10:
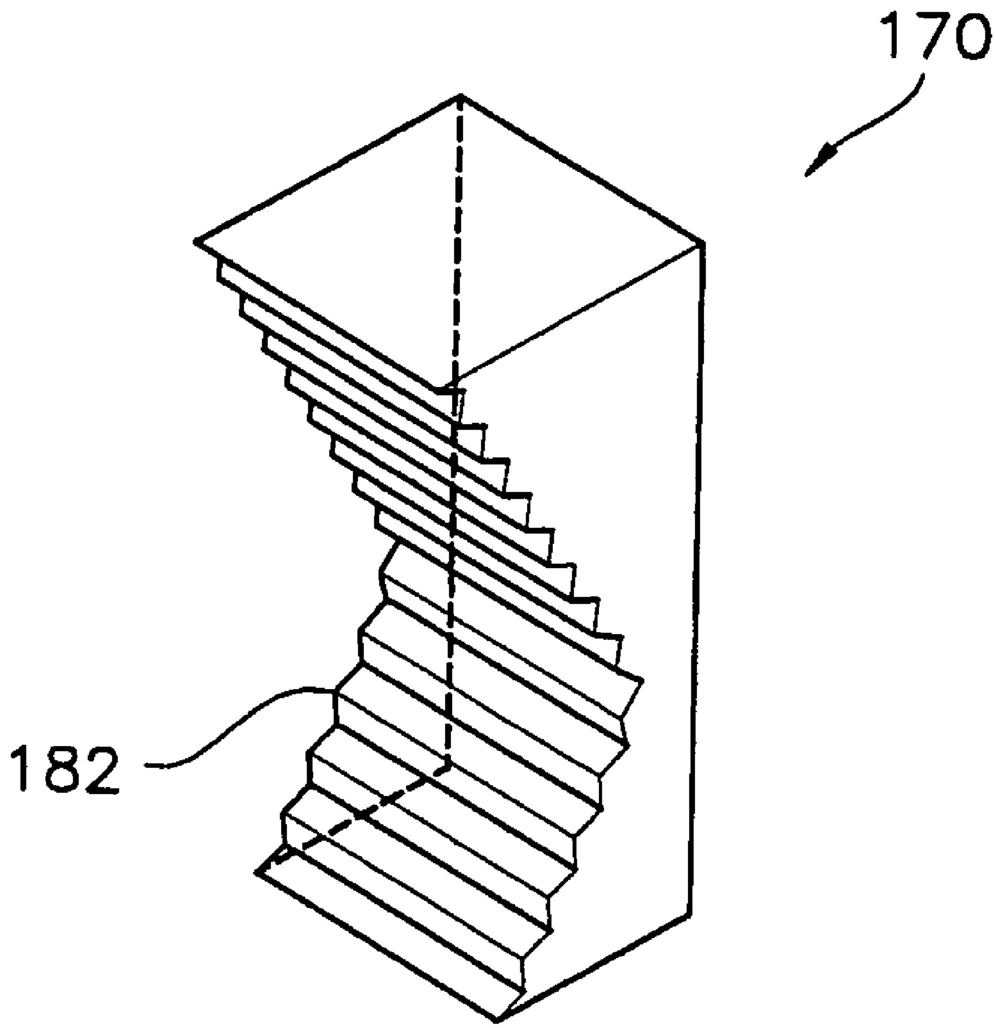
FIG. 10 is a side perspective view of a light guiding plate shown in FIG. 9.

FIGS. 9 and 10 are plan views showing the third light guiding plate shown in FIGS. 7 and 8, in which a pattern is formed in the second concave section of the third light guiding plate.

Referring to FIG. 9, an optical route changing pattern 182 is formed in the second concave section 180 of the third light guiding plate 170 for adjusting the optical route for the light incident from the light sources 111 to 117. The optical route changing pattern 182 is continuously formed along an inclined surface of the second concave section 180. When viewed in a plan view, the optical route changing pattern 182 has a triangle shape. In addition, the pitch of the triangle shaped pattern 182 is directed towards the light projecting surface 173.

As shown in FIG. 10, the optical route changing pattern 182 can be formed through cutting the third light guiding plate 170 in the pattern shape, or can be manufactured by an injection molding process. Since the optical route changing pattern 182 has a minute structure, it is preferred to form the optical route changing pattern 182 by the injection molding process.

Figure 11:
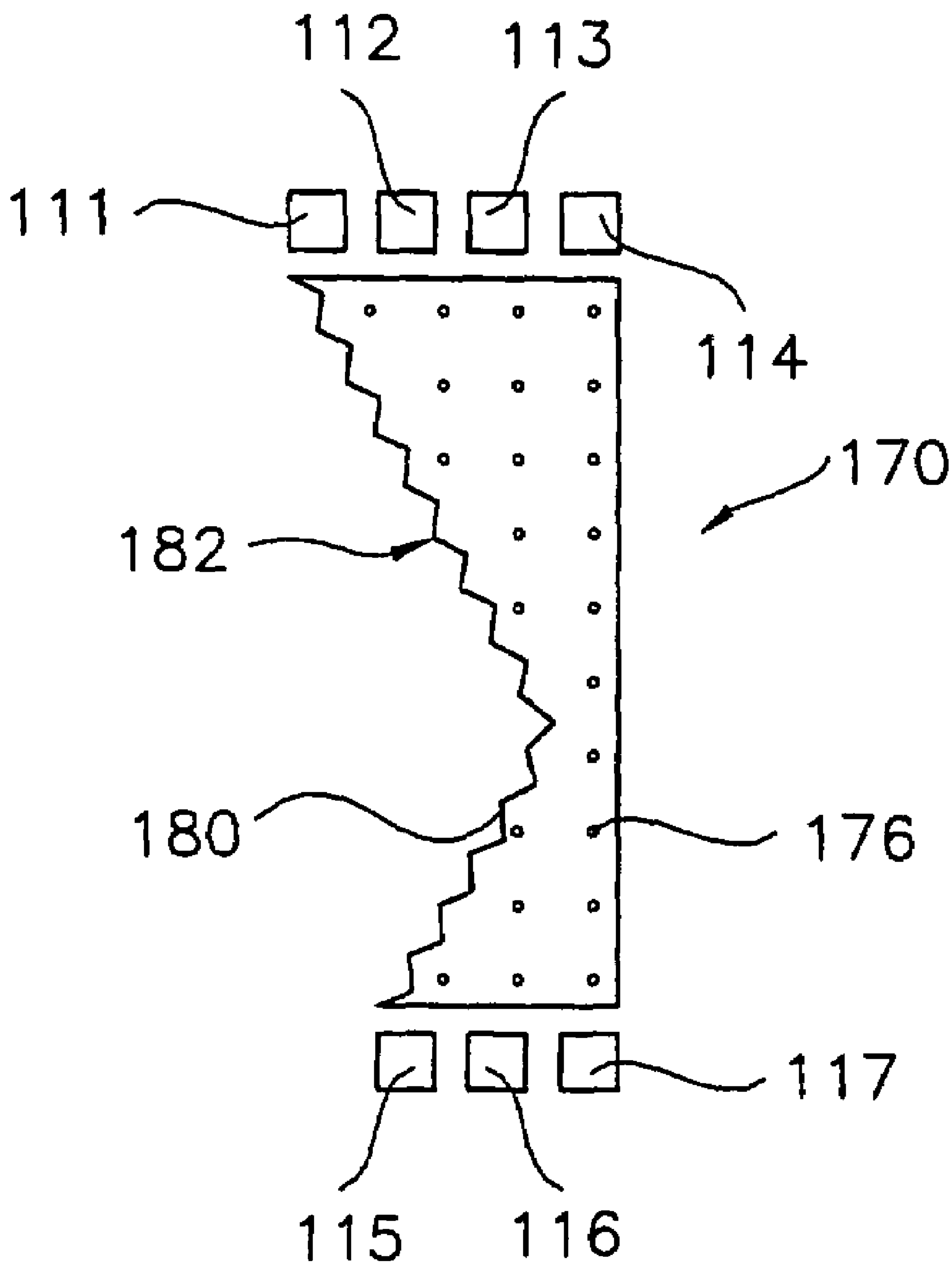
FIG. 11 is a plan view of a light guiding plate shown in FIG. 9 formed with a light scattering material.

FIG. 11 is a plan view of the third light guiding plate shown in FIG. 9 formed with a light scattering material.

Referring to FIG. 11, a light scattering element 176 including a plurality of minute particles having a refraction index different from a refraction index of the third light guiding plate 170 is formed in the third light guiding plate 170. The light scattering element 176 may have a diameter of about 6–7 μm. The light scattering element 176 may includes a silicon resin having the refraction index of 1.43, and the remaining section of the third light guiding plate 170 may include PMMA having the refraction index of 1.49.

In this manner, the third light guiding plate 170 has a light scattering property. That is, since the third light guiding plate 170 diffuses the light incident from the light sources 111 to 117, the third light guiding plate 170 serves as the diffusing plate 140 as shown in FIG. 3, which is arranged between the second light guiding plate 120 and the light guiding section 200 to diffuse the light projected from the second light guiding plate 120. Accordingly, it is possible to remove the diffusing plate 140 from the liquid crystal display device 400, so reflection type liquid crystal display device 400 has a lighter, slimmer and compact-sized structure.

Figure 12:
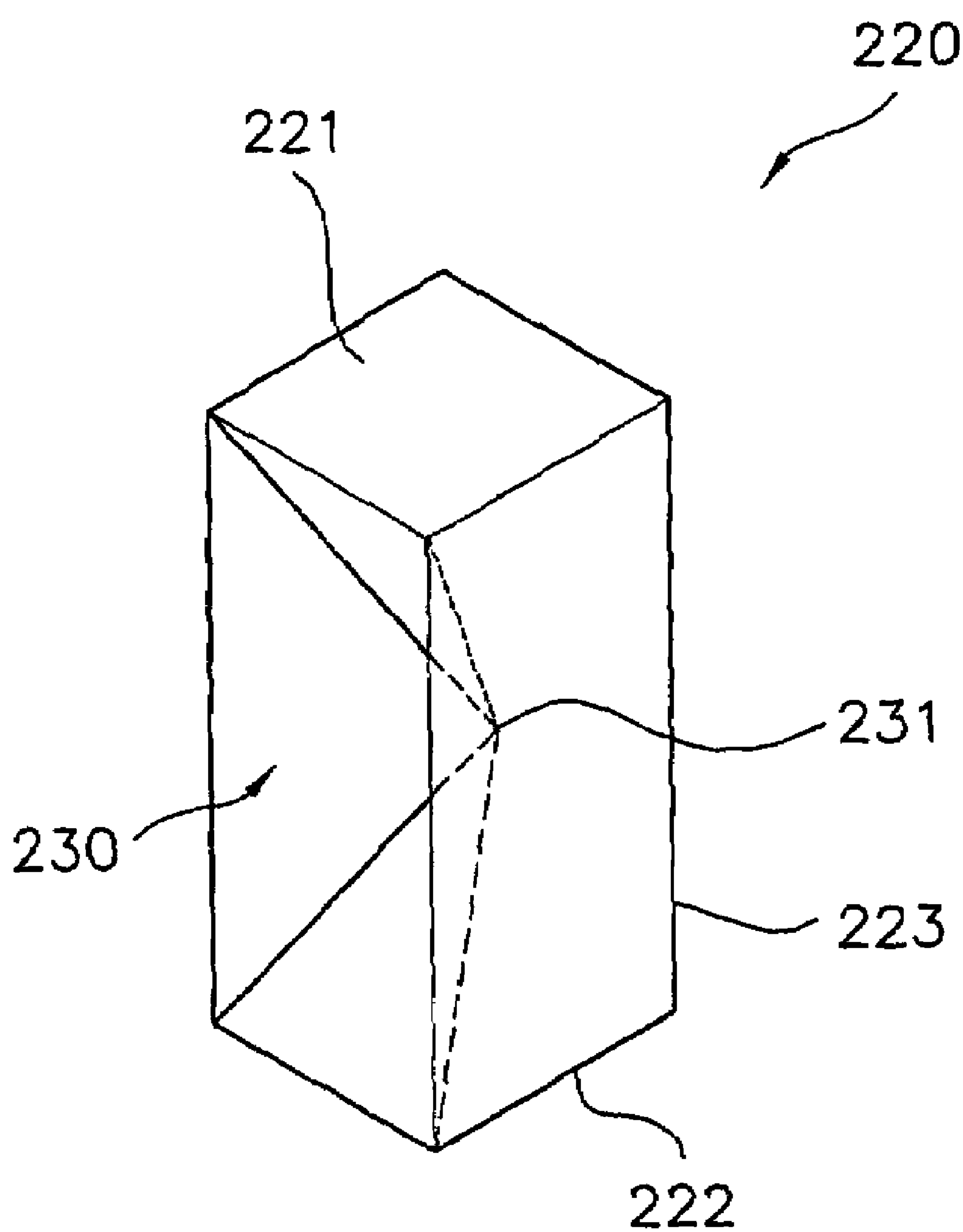
FIG. 12 is a perspective view showing the structure of a light guiding plate according to another exemplary embodiment of the present invention.

FIG. 12 is a perspective view for explaining the structure of the light guiding plate according to another embodiment of the present invention.

Referring to FIG. 12, a fourth light guiding plate 220 has a fifth light incident surface 221 and a sixth light incident surface 222 opposite the fifth light incident surface 221, in which a plurality of light sources (not shown) are disposed adjacent to the fifth and sixth light incident surfaces 221 and 222 to emit the light into the fifth and sixth light incident surfaces 221 and 222. In addition, the fourth light guiding plate 220 has a light projection surface 223 for projecting the light incident through the fifth and sixth light incident surfaces 221 and 222, and a third concave section 230 which is recessed in a reverse pyramid shape from an opposite surface of the light projecting surface 223 towards the light projection surface 223.

The third concave section 230 has four inclined surfaces, which are incorporated with each other to form a bottom portion 231. At this time, the bottom portion 231 is directed towards the light projecting surface 223. In this manner, by forming one side portion of the fourth light guiding plate 220 with four inclined surfaces, the light emitted from the plurality of light sources disposed adjacent to the fifth and sixth light incident surfaces 221 and 222 uniformly arrives at the four inclined surfaces. Accordingly, the optical route of the light emitted from the plurality of light sources (not shown) is changed by the four inclined surfaces, so the optical efficiency of the light is improved.

In addition, since the third concave section 230 is formed at the fourth light guiding plate 220, the fourth light guiding plate 220 has a margin surface. That is, due to the third concave section 230 formed in the fourth light guiding plate 220, the effective space occupied by the fourth light guiding plate 220 is remarkably reduced. Accordingly, the size of the reflection type liquid crystal display device 400 can be reduced through utilizing the remaining space.

The optical route changing pattern (not shown) can be formed in the four inclined surfaces of the third concave section 230 for changing the optical route of the light incident from the plurality light sources (not shown).

In addition, it is possible to remove the diffusing plate 140, as shown in FIG. 3, provided between the fourth light guiding plate 220 and the light guiding section 200 by applying a light scattering material in the fourth light guiding plate 220 for projecting a diffused light.

As mentioned above, according to the illumination device and the reflection type liquid crystal display device having the illumination device of the present invention, the light guiding plate, which is provided between at least one light source and the light guiding section to guide the light from the light source towards the light guiding section, is formed such that a distance between the light projecting surface of the light guiding plate and the opposite surface of the light projecting surface becomes narrow as an amount of light flux of the light emitted from at least one light source decreases.

Therefore, the light generated from each light source uniformly arrives at the opposite surface of the light projecting surface even when the number of light sources disposed adjacent to opposite ends of the light guiding plate is increased. Accordingly, the optical route of the light is changed when the light arrives at the inclined surfaces of the opposite surface, so the optical efficiency of the light is improved.

While the present invention has been described in detail with reference to the preferred embodiments thereof, it should be understood to those skilled in the art that various changes, substitutions and alterations can be made hereto without departing from the scope of the invention as defined by the appended claims.

What is claimed is:

1. An illumination device comprising:

a light generator to generate a light;

a first light guider including a first portion through which the light is incident and a second portion from which the light is emitted; and a second light guider including opposite first and second side portions, at least one of which is adjacent to the light generator, a light projecting portion adjacent to the first portion of the first light guider and a light reflecting portion including a first inclined surface and a second inclined surface, the light projecting portion having a flat surface, a distance between the first inclined surface and the flat surface becoming narrow as an amount of a flux emitted from the light generator decreases, and a distance between the second inclined surface and the flat surface becoming narrow as an amount of a light flux emitted from the light generator decreases.

2. The illumination device as claimed in claim 1, wherein the light generator includes at least one light source.

3. The illumination device as claimed in claim 2, wherein the light source is a point-shaped light source.

4. The illumination device as claimed in claim 1, wherein the light reflecting portion includes a concave section.

5. The illumination device as claimed in claim 4, wherein the concave section has a V shape inclined from opposite side ends of the light reflecting portion adjacent to the first and second side portions.

6. The illumination device as claimed in claim 4, wherein the concave section has a bottom portion, and a position of the bottom portion is defined by a following equation;

$$x:y=w1:w2,$$

wherein, x is a linear distance from the first side portion to the bottom portion, y is a linear distance from the second aide portion to the bottom portion, x+y is a linear distance from the first side portion to the second side portion, w1 is the width of the first side portion, and w2 is the width of the second side portion.

7. The illumination device as claimed in claim 6, wherein a value of x is substantially equal to a value of y.

8. The illumination device as claimed in claim 1, wherein the light generator includes at least one first light source adjacent to the first side portion of the second light guider and at learn one second light source adjacent to the second side portion of the second light guider.

9. The illumination device as claimed in claim 8, wherein a number of the first light sources is the same as a number of the second light sources.

10. The illumination device as claimed in claim 8, wherein a first number of the first light sources is different from a second number of the second light sources.

11. The illumination device as claimed in claim 10, wherein widths of the first and second side portions are defined by a following equation;

$$w1:w2=n1:n2,$$

wherein w1 is the width of the first side portion, and w2 is the width of the second side portion, n1 is the first number of the first light sources, and n2 is the second number of the second light sources.

12. The illumination device as claimed in claim 6, wherein a linear distance between the bottom portion and the light projecting portion is smaller than a smaller width of the widths of the first and second side portions.

13. The illumination device as claimed in claim 4, wherein the concave section comprises a plurality of groove patterns.

14. The illumination device as claimed in claim 1, wherein the second light guider has a light scattering member which uniformly diffuses the light incident through the first and second side portions and umiformly distributes a light flux projected through the light projecting portion.

15. The illuminating device of claim 1, wherein the first inclined surface is inclined from an end of the first portion to the light projecting portion, and a second inclined surface is inclined from an end of the second portion to the light projecting portion.

16. The illuminating device of claim 1, wherein widths of the first and second side portions are defined according to an amount of the light input to the first and second side portions, respectively.

17. A reflection type liquid crystal display device including a liquid crystal display panel for displaying an image, and an illumination device disposed in a front of the liquid crystal display panel, the illumination device comprising:

a light generator to generate a light;

a first light guider including a first portion through which the light is incident and a second portion from which the light is emitted; and a second light guider including opposite first and second side portions, at least one of which is adjacent to the light generator, a light projecting portion adjacent to the first portion of the first light guilder and a light reflecting portion including a first inclined surface and a second inclined surface, the light projecting portion having a flat surface, a distance between the first inclined surface and the flat surface becoming narrow as an amount of a light flux emitted from the light generator decreases, a distance between the second inclined surface and the flat surface becoming narrow as an amount of light flux emitted from the light generator decreases.

18. The reflection type liquid crystal display device as claimed in claim 17, wherein the light generator includes at least one light source.

19. The reflection type liquid crystal display device as claimed in claim 18, wherein the at least one light source is a point-shaped light source.

20. The reflection type liquid crystal display device as claimed in claim 17, wherein the light reflecting portion includes a concave section towards the light projecting surface.

21. The reflection type liquid crystal display device as claimed in claim 20, wherein the concave section has a V shape inclined from opposite side ends of the reflecting portion adjacent to the first and second side portions.

22. The reflection type liquid crystal display device as claimed in claim 20, wherein the concave section baa a bottom portion, and a position of the bottom portion is defined by a following equation;

$$x:y=w1:w2,$$

wherein, x is a linear distance from the first side portion to the bottom portion, y is a linear distance from the second side portion to the bottom portion, x+y is a linear distance from the first side portion to the second side portion, w1 is the width of the first side portion, and w2 is the width of the second side portion.

23. The reflection type liquid crystal display device as claimed in claim 22, wherein a linear distance between the bottom portion and the light projecting portion is smaller than a smaller width of the widths of the first and second side portions.

24. The reflection typo liquid crystal display device as claimed in claim 20, wherein the concave section comprises a plurality of groove patterns.

25. The reflection type liquid crystal display device as claimed in claim 17, wherein the second light guider comprises a light scattering member which uniformly diffuses the light Incident through the first and second side portions and uniformly distributes a light flux projected through the light projecting portion.

26. The reflection type liquid crystal display device as claimed in claim 17, wherein the amount of the light input to the first side portion is different from the amount of the light input to the second side portion, the widths of the first and second side portions are defined by a following equation:

$$w1:w2=n1:n2,$$

wherein w1 is the width of the first side portion, and w2 is the width of the second side portion, n1 is the amount of the light input to the first side portion, and n2 is the amount of the light to the second side portion.

27. The illuminating device of claim 17, wherein the first inclined surface is inclined from an end of the first portion to the light projecting portion, and a second inclined surface is inclined from an end of the second portion to the light projecting portion.

28. The illuminating device of claim 17, wherein widths of the first and second side portions are defined according to an amount of the light input to the first and second side portions, respectively.

29. An illuminating device comprising:

a light generator to generate a light;

a first light guider including a first portion through which the light is incident and a second portion from which the light is emitted; and a second light guider including opposite first and second portions, at least one of which is adjacent to the light generator, a light projecting portion adjacent to the first portion of the first light guider and a light reflecting portion including a first inclined surface and a second inclined surface, the light projecting portion having a flat surface, a distance between the first inclined surfaces and the flat surface becoming narrow as an amount of a light flux emitted from the input generator decreases, a distance between the second inclined surface and the flat surface becoming narrow as an amount of a light flux emitted from the light generator decreases, wherein the first and second inclined surface comprising a plurality of groove patterns.

30. The illuminating device of claim 29, wherein the groove patterns have a V shape.

* * * * *

UNITED STATES PATENT AND TRADEMARK OFFICE

CERTIFICATE OF CORRECTION

PATENT NO. : 7,018,085 B2
APPLICATION NO. : 10/838036
DATED : March 28, 2006
INVENTOR(S) : Keun-Woo Lee et al.

It is certified that error appears in the above-identified patent and that said Letters Patent is hereby corrected as shown below:

Title Page:
Item (57) Abstract, after "Disclosed" delete "are" and insert therefor -- is --.
Insert -- Item (73) Assignee: Samsung Electronics Co., LTD. (KR) --.

Column 11:
Line 17, after "at" delete "learn" and insert therefor -- least --.

Column 12:
Line 4, after "reflection" delete "typo" and insert therefor -- type --.
Line 13, after "wherein" delete "the".
Line 47, after "light" delete "Incident" and insert therefor -- incident --.

Signed and Sealed this

First Day of May, 2007

JON W. DUDAS
*Director of the United States Patent and Trademark Office*